Feb. 15, 1966        W. RUF         3,234,989
MISSILE-PROOF GROUND WHEEL
Filed Feb. 3, 1964                    6 Sheets-Sheet 1

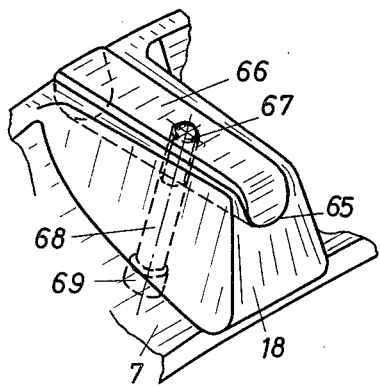
Fig. 5
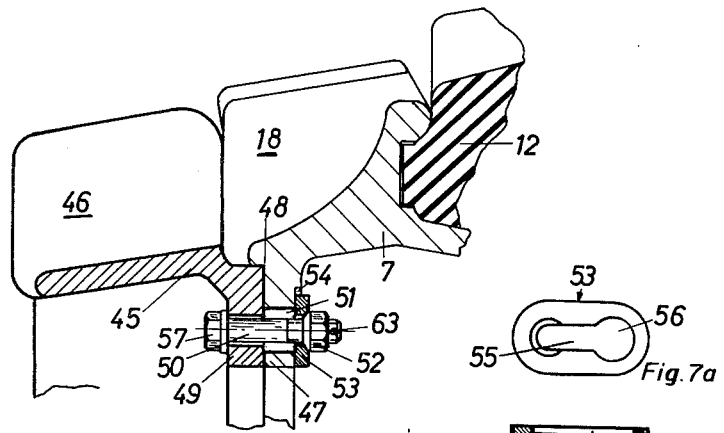
Fig. 6
Fig. 7a
Fig. 7
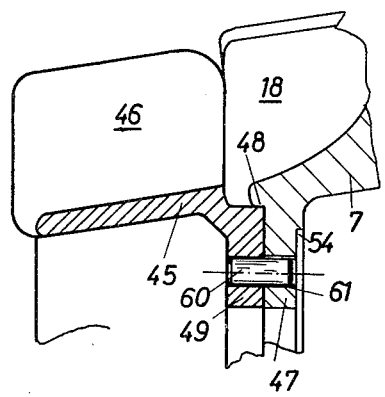
Fig. 8

Feb. 15, 1966 W. RUF 3,234,989
MISSILE-PROOF GROUND WHEEL
Filed Feb. 3, 1964 6 Sheets-Sheet 6

3,234,989
MISSILE-PROOF GROUND WHEEL
Walter Ruf, Landhaus am See, Bottighofen,
Thurgau, Switzerland
Filed Feb. 3, 1964, Ser. No. 341,867
Claims priority, application Germany, Feb. 15, 1963,
R 34,474, R 34,475; Feb. 20, 1963, R 34,503; Dec. 5,
1963, R 34,725; Dec. 19, 1963, R 36,844; Jan. 15,
1964, R 36,975, R 36,976, R 36,977
13 Claims. (Cl. 152—43)

The invention relates to a missile-proof ground wheel comprising a wheel body that is adapted for connection to a vehicle axle and a tire made of resilient material and mounted on the wheel body.

The term "missile-proof ground wheel" as employed herein is intended to mean a wheel which is particularly suitable for use on military vehicles and the sensitive parts of which are partially armoured, i.e. partially protected against impingement from missiles, but which enables the vehicle to continue to move even if the tire has been hit or penetrated by a missile.

Vehicles fitted with conventional wheels can usually not be driven after a tire has been hit by a missile because the air escapes from the tire which becomes deflated and is almost immediately destroyed under the load of the vehicle. It has already been proposed to overcome this disadvantage by using solid rubber tires but such tires are relatively inelastic and do not permit high speed travel of the vehicle.

It is an object of the invention to provide a missile-proof ground wheel, especially for use on military vehicles, which permits continued motion of the vehicle even if the tire of the wheel has been penetrated by a missile.

It is a further object of the invention to provide a missile-proof ground wheel which permits continued motion of the vehicle at relatively high speeds even if the tire of the wheel has been penetrated by a missile.

It is another object of the invention to provide a missile-proof ground wheel having a hermetically sealed air chamber.

It is yet another object of the invention to provide a missile-proof ground wheel in which an air chamber is protected from lateral impingement by a missile.

It is a further object of the invention to provide a missile-proof ground wheel having a resilient tire and permitting ready withdrawal of the heat generated during working or distortion of the tire.

It is a still further object of the invention to provide a missile proof ground wheel in which the means for holding the tire to an inner wheel body are resiliently displaceable in an axial and radial direction.

It is another object of the invention to provide a missile-proof ground wheel wherein relative rotation between the tire and its mounting means is prevented.

A further object of the invention resides in increasing the stability of a ground wheel having a tire clamped between internal and external mounting means.

It is a still further object of the invention to provide a missile proof ground wheel having a laterally extensible ramming surface or tread.

Yet another object of the invention is to provide a missile-proof ground wheel for which the running surface or tread can be renewed or regenerated after wear.

Other objects of the invention will be evident from the following description of preferred embodiments of a missile-proof ground wheel. Reference will be made to the accompanying drawings, and it is to be understood that the description and drawings are merely by way of example. In the drawings:

FIG. 5 is a perspective view of a rib of the ground wheel with steel insert;

FIG. 6 is a part-sectional elevation of an additional rim mounted on the ground wheel;

FIG. 7 is a composite plan and side elevation of a cotter plate used for mounting the additional rim in FIG. 6;

FIG. 8 is a sectional elevation similar to FIG. 6 but taken in a different plane;

Figure 1:
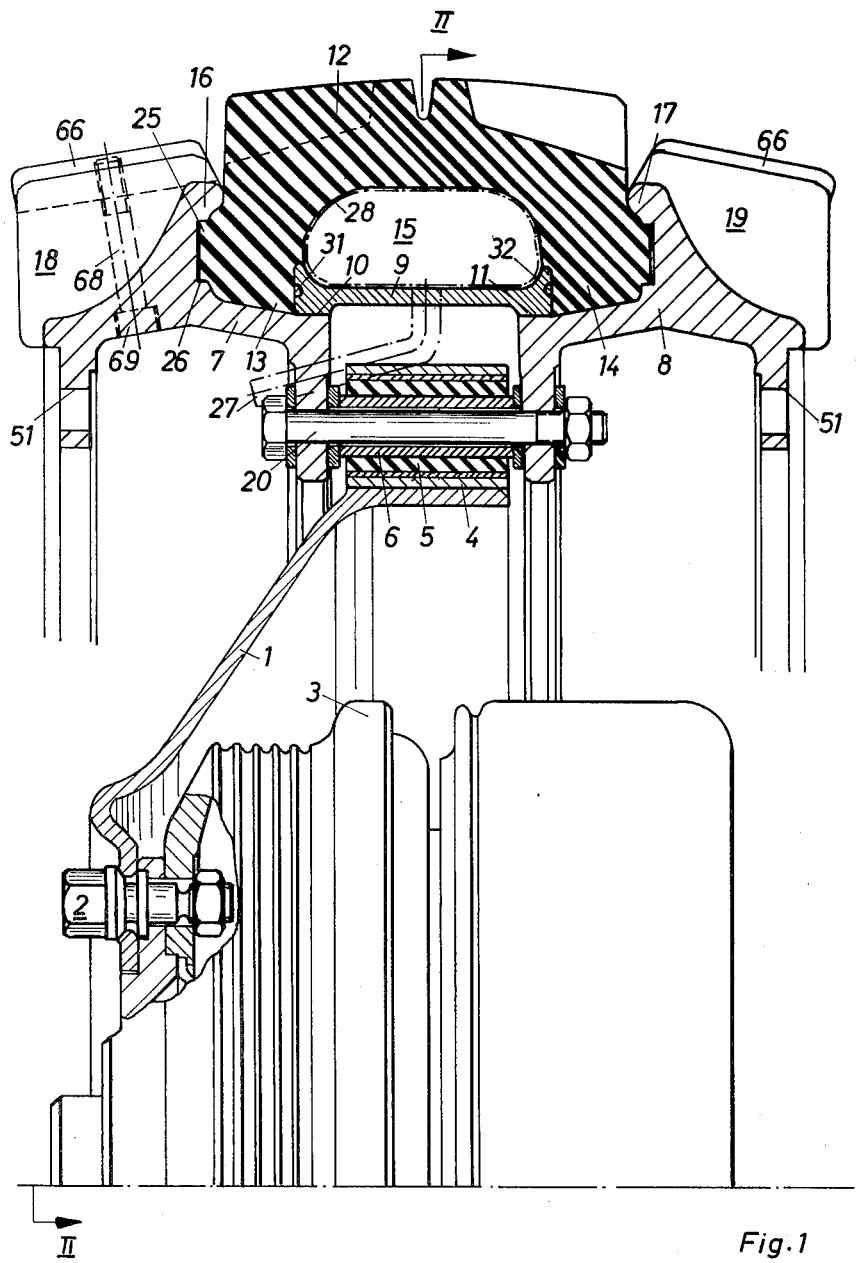
FIG. 1 is a part-sectional elevation taken through the rotary axis of a missile-proof ground wheel according to the invention.
Figure 2:
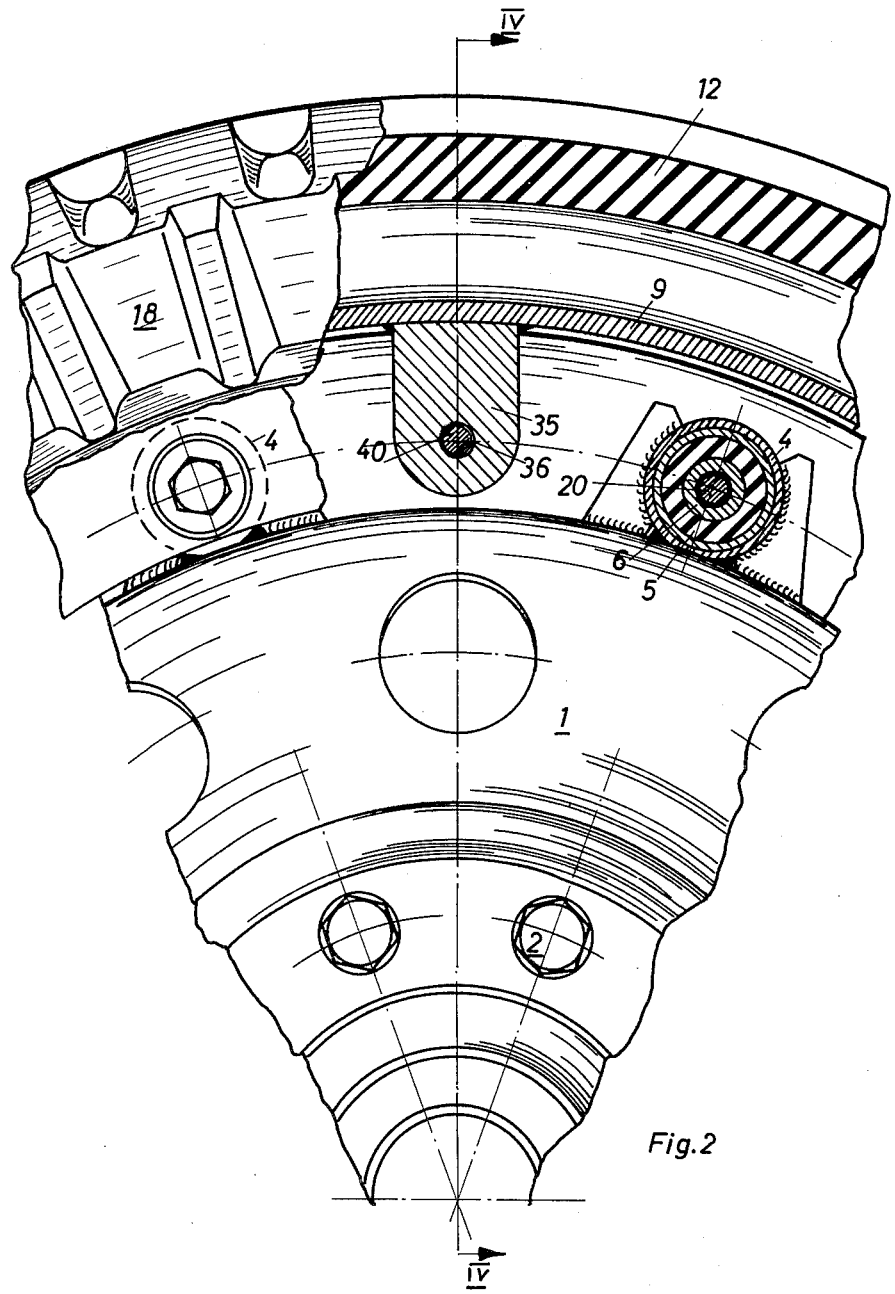
FIG. 2 is a part-sectional side elevation taken on the line II—II in FIG. 1.
Figure 3:
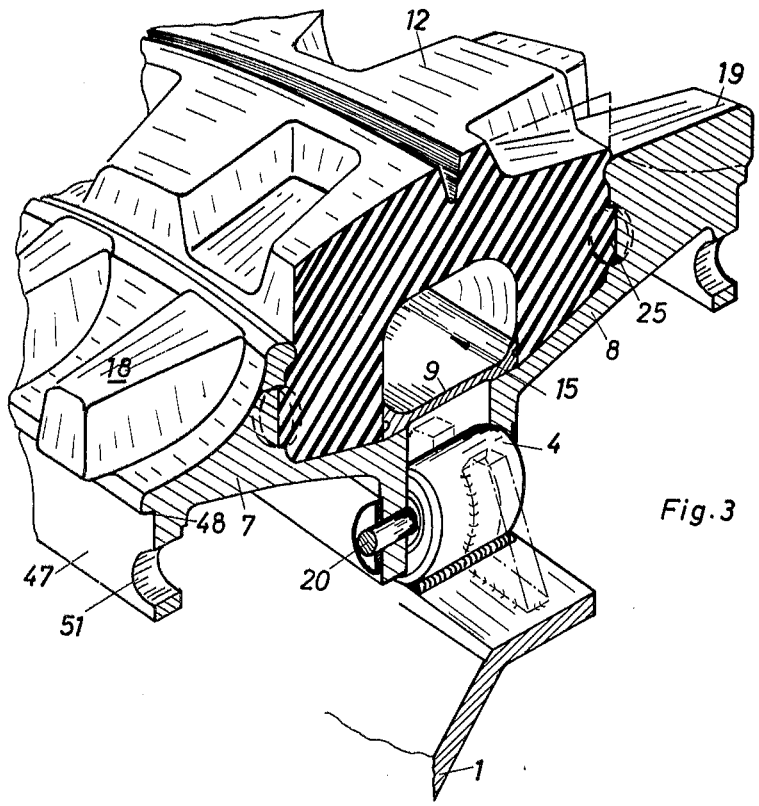
FIG. 3 is a sectional perspective view of the running face or tread of a ground wheel according to the invention.

The missile-proof ground wheel illustrated in FIGS. 1–3 comprises an inner wheel body 1 which is fixed in the usual manner to a hub or brake-drum housing 3 with the aid of bolts 2. Along the periphery of the body 1, so-called silent blocks are welded at angular spacings of preferably 15 to 40°. Each silent block comprises a sleeve 4 accommodating an intermediate sleeve 5 and an inner sleeve 6, the intermediate sleeve 5 being made of resilient material, preferably rubber. The sleeves 4 and 6 are connected to the resilient sleeve 5 such as by vulcanization.

In the illustrated version, the wheel comprises two substantially symmetric rim halves or sections 7 and 8 and over these there is placed a ring 9 which rests on the rim sections 7 and 8 with its marginal portions 10 and 11. Although the illustrated ring 9 is made in one piece, it should be mentioned at this stage that the ring may comprise two or more segments, as will be clear to those skilled in the art. The rim sections 7 and 8 are connected to each other and, through the silent block comprising the sleeves 4, 5 and 6, to the inner wheel body 1 with the aid of bolts 20 or the like. Owing to the resilient nature of the material used for the sleeve 5, the wheel is thus given a certain amount of inherent resilience and its principal components can adjust themselves in a radial as well as axial direction during motion of the vehicle.

The rim sections 7 and 8 constitute external clamping or mounting means for the tire 12 which is made from resilient material and is of substantially U-shaped cross-section, the limbs 13 and 14 of the U exhibiting bead-like enlargements. The outer edges 16 and 17, i.e. the edges of largest diameter, of the rim sections 7 and 8, respectively, are directed towards the central plane of the wheel so that they embrace the bead-like enlargements of the limbs 13 and 14 of the rubber tire 12. The breadth of the limbs 13 and 14 of the tire 12 preferably amounts to about one-quarter to one-third or even more of the total width of the tire 12.

The outer faces of the limbs 13 and 14 are provided with pimple-like projections 25 of circular cross-section which engage in complementary recesses 26 in the internal sides of the rim sections 7 and 8 and thereby prevent relative rotary displacement between the tire and rim sections. It will be evident that the interengaging projections and recesses may take forms other than that illustrated in the drawings. Also it will be clear to those skilled in the art that the projections could be provided on the rim sections for engagement with indents or recesses provided in the tire.

The aforementioned ring 9 constitutes internal clamping or mounting means for the tire 12 and is preferably somewhat broader than the internal spacing between the tire limbs 13 and 14 prior to mounting, so that the ring 9 becomes securely seated between such limbs. The substantially radially extending side faces of the ring 9 each exhibit at least one groove or annular channel 31 and 32, respectively, into which the resilient tire material penetrates during insertion of the ring 9 between the tire limbs 13 and 14. In this way, a labyrinth seal is provided which effectively seals the chamber 15 bounded or formed between the ring 9 and the tire 12. If desired, such chamber 15 may be additionally inflated with air through a valve 27 but this is not absolutely essential. Further, it is possible, but not essential, to insert a conventional inflatable tube 28 within the chamber 15. Preferably, the dimensions for the tire 12 are designed such that the thickness of the outer wall of the tire is substantially equal to the height of the chamber 15.

The wheel as described thus far can be assembled in the following manner:

The ring 9, which may comprise two halves or sections to facilitate assembly, is inserted between the limbs 13 and 14 of the tire 12 with a press fit. Thereafter, the tire is pushed over one rim section, for example the section 8. Subsequently, the rim section 7 is applied. The rim sections are now connected to one another and to the wheel body 1 with the aid of the bolts 20. Upon tightening the bolt connections, the limbs 13 and 14 become so tightly clamped between the side faces of the ring 9 and the rim sections 7 and 8 that no air can escape from the chamber 15.

The chamber 15 between the ring 9 and tire 12 is bounded by the inside of the outer wall of the tire such that the chamber does not extend radially outwardly beyond the side edges 16 and 17 of the rim sections 7 and 8. The chamber 15 is thus armoured against lateral and oblique impingement of missiles as viewed in the direction of motion of the vehicle. On the other hand, if a missile coming from directly in front of the vehicle happens to penetrate the chamber 15, and allow any air therein to escape, continued motion of the vehicle is nevertheless possible. The reason for this is that the thick limbs 13 and 14 and the thick outer wall lend the tire a certain amount of inherent stiffness. In any case, the tire can be compressed only to an extent equivalent to the small height of the chamber 15; thereafter, the tire comes to rest on the ring 9. Anoher reason is that the tire 12 is locked in engagement with the rim sections 7 and 8 by virtue of the projections 25; consequently, relative twist between the tire and rim sections is precluded.

The rim sections 7 and 8 armouring the sides of the tire 12, as well as the ring 9, are preferably made from a metal, for an example an aluminium alloy, having a thermal conductivity greater than 0.15, preferably greater than 0.3 calorie per centimetre second degree. This ensures that the heat generated during working or deformation of the tire 12 as the vehicle moves can be readily withdrawn by conduction, which constitutes a further advantage of the missile-proof wheel according to the invention. If desired or necessary, the contacting faces between the clamping means 7, 8, 9 and the tire 12 can be profiled to have an area greater than that indicated in the drawings so as to facilitate thermal conduction.

Figure 4:
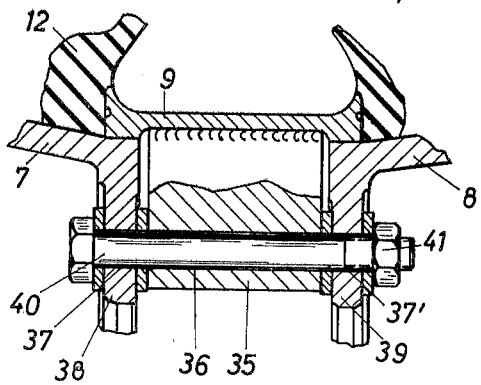
FIG. 4 is a part-sectional elevation taken on the line IV—IV in FIG. 2.

Generally, the ring 9 will be loosely applied to the rim sections 7 and 8. To increase the stability of the ground wheel, however, it may in some cases be desirable or expedient to provide a positive connection between the clamping means, i.e. between the rim sections 7, 8 and the ring 9. For this purpose, and as illustrated in FIGS. 2 and 4, relatively wide inwardly directed web members 35 may be welded along the inside of the ring 9. Such webs 35 are preferably disposed circumferentially of the wheel so that they lie between the aforementioned silent blocks by which the rim sections 7 and 8 are connected to the wheel body 1. The webs 35 comprise apertures 36 which can be aligned with apertures 37 and 37' at the inner peripheral edges 38, 39 of the rim sections 7 and 8. After aligning the apertures and interposing suitable washers, a bolt 40 is inserted therethrough and has a nut 41 screwed thereon. This ensures that each web 35 can be securely but releaseably connected to the rim sections 7 and 8 and in this manner the ring 9 becomes positively connected to the rim sections and the wheel as a whole has imparted to it an improved rigidity without detrimentally influencing the resilient connection between the rim sections 7 and 8 and the wheel body 1.

As most clearly shown in FIGS. 1 and 3, the laterally tapering rim sections 7 and 8 are fitted with ribs 18 and 19. The tops of these ribs, together with the outer wall of the tire, form a portion of the running surface or tread of the wheel and it is desirable that the width of the outer wall of the tire 12 amounts to about half of the total width of the running surface. However, the outer wall of the tire, which is also ribbed, projects beyond the upper extremities of the ribs 18 and 19.

When the vehicle is driven on any normal surface such as a road surface, the effective running surface of the wheel is formed exclusively by the outer wall of the tire because in this case the ribs 18 and 19 make no contact with the ground. Extremely resilient motion of the vehicle is achieved under such circumstances. The ribs 18, 19 engage the ground only when the vehicle is driven over soft earth into which the tires 12 sink.

In order to decrease the specific ground reaction still further during travel over soft or swampy ground, at least one of the rim sections can have an additional annular rim portion 45 bolted thereto so as to increase the running surface of the wheel, as shown in FIGS. 6 to 8. If only one additional rim portion 45 is applied to each wheel, it is preferably bolted to the external side of the wheel. The rim portions 45 may likewise be fitted with upstanding ribs 46.

The rim sections 7 and 8 carry a radially inwardly extending flange or web 47 (FIG. 3) formed with an externally directed step or emplacement 48. The additional rim portion 45 has a similar radially inwardly directed flange or web 49, is seated in the emplacement 48 and is connected to the rim section 7 and/or 8 by bolts 50. Upon completion of the bolt connection, the tops of the ribs 46 on the rim portions 45 are located such that they form a substantial continuation of the inclined running surface formed by the ribs 18 on the rim section 7. Accordingly, the entire running surface of the wheel is laterally extended and sinking into soft earth is minimized.

In the illustrated embodiment of FIGS. 6 and 8, the radially inwardly extending web 47 on the rim sections is provided with circumferentially spaced holes 51 each having a diameter such that the head 57 of the bolt 50 or a nut 52 screwed on to the bolt 50 can be passed through the hole.

A cotter plate 53 having a shape such as that shown in FIG. 7 may serve to fix the bolt 50 into its hole 51. The cotter plate 53 which is inserted in a recess 54 in the web 47, is provided with an elongated aperture 55 of keyhole formation terminating in a circular enlargement 56. The diameter of the enlargement 56 is substantially equal to the diameter of the hole 51 and is thus likewise somewhat larger than the diameter of the nut 52 or the bolt head 57.

During assembly of the rim portion 45 and rim section 7, the bolt 50 is passed through the rim portion 45 and the nut 52 is screwed on to the bolt. Thereafter, the nut 52 is passed through the hole 51 in the web 47. The cotter plate 53 can now be placed over the bolt 50 in that the nut 52 passes through the hole 56, whereafter the cotter plate is laterally displaced so that the shank of the bolt 50 passes into the narrower portion of the elongated aperture 55. A depression or countersunk portion 59 may be provided at the narrow end of the elongated aperture 55 so that the nut 52 comes to lie therein. In this manner, the bolt 50 is prevented from slipping out again and the bolt connection can be completed by applying a spanner or the like to the head 57 of the bolt 50 and an appropriate counter force at the nut 52.

As shown in FIG. 8, which is a section similar to that of FIG. 6 but taken in a different plane, the web 49 of the rim portion 45 carries inwardly directed pins 60 which are circumferentially spaced so as to lie between the bolts 50. Complementary apertures 61 are provided at the appropriate locations in the rim section 7 and during assembly of the rim portion and rim section the apertures 61 receive the pins 60. In this manner, additional rigidity and stability is ensured for the assembly and, during assembly, the pins 60 also serve properly to locate or centre the rim portion 45.

Preferably, the bolts 50 are permanently secured to the rim portion 45 so that they cannot be lost. In other words, they are permanently but loosely introduced in the rim portion 45 and prevented by the nuts 52 from falling out again. The nuts, in turn, can be prevented from coming off the ends of the bolts by hammering over such ends 63. As a result, the application of the additional rim portion 45 can take place very rapidly.

The rim sections 7 and 8 as well as the additional annular rim portions 45 are preferably made from like metal such as an aluminum alloy so that they will not be too heavy and so that they assist in the rapid withdrawal of heat that is generated during working or deformation of the tire 12. On the other hand, since the ribs 18 and 46 of the rim sections and rim portions, respectively, form a portion of the running surface of the wheel, the ribs may wear out rather rapidly and necessitate replacement of the wheel. It is a further feature of the invention, therefore, to provide the ribs with projecting inserts made of steel or some other more wear-resistant material which could even be a resilient material. Although such inserts are also applicable to the ribs 46 of the rim portions 45, they are illustrated only in connection with the ribs 18 (see FIGS. 1 and 5). The inserts 66 are replaceably accommodated in recesses 65 provided in the ribs and they project from the ribs so that ground engagement by the vehicle will take place through the inserts and the ribs themselves are substantially safe-guarded during motion of the vehicle.

The inserts 66 are provided with tapped holes 67 receiving bolts or screws 68 which are introduced radially inwardly of the wheel. The head 69 of the screw 68 bears on the laterally tapering rim section 7 or 8. Preferably, the screw 68 is a socket-headed screw, in which case the head 69 can be completely countersunk in the rim section as shown in FIG. 1.

Since the stresses encountered during motion of the vehicle are now for the most part borne by the steel inserts 66, it suffices to exchange the latter from time to time, this being readily possible by loosening the screws 68. It may be desirable to provide the inserts 66 with sharply ground edges which give the wheel particularly advantageous running properties on grass. In this case, it may suffice to regrind the edges of the inserts.

Figure 9:
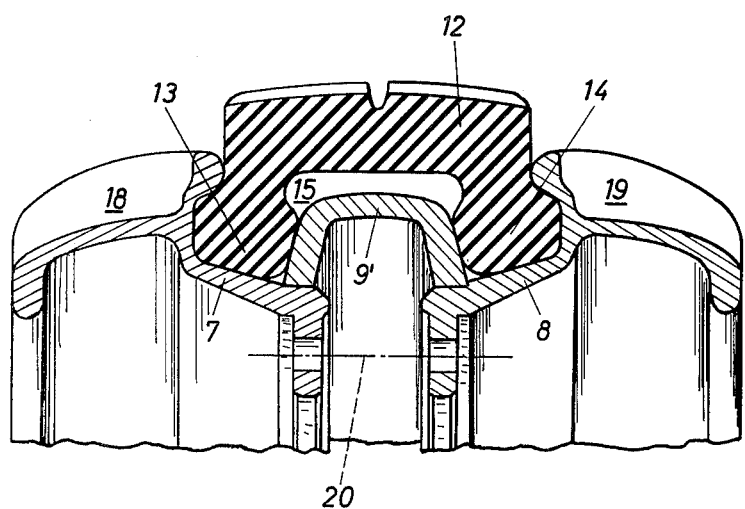
FIGS. 9–11 are part-sectional side elevations showing modifications of the ground wheel according to the invention.

In the modified embodiment of FIG. 9, the ring 9' constituting the internal mounting or clamping means for the tire is of U-shaped cross-section, the limbs of the U being inclined to the central plane of the wheel. This permits an extremely shallow chamber 15 to be obtained. In other respects, the FIG. 9 construction can be substantially the same as that of FIG. 1, although it will be noted that the components are given a different configuration.

Figure 10:
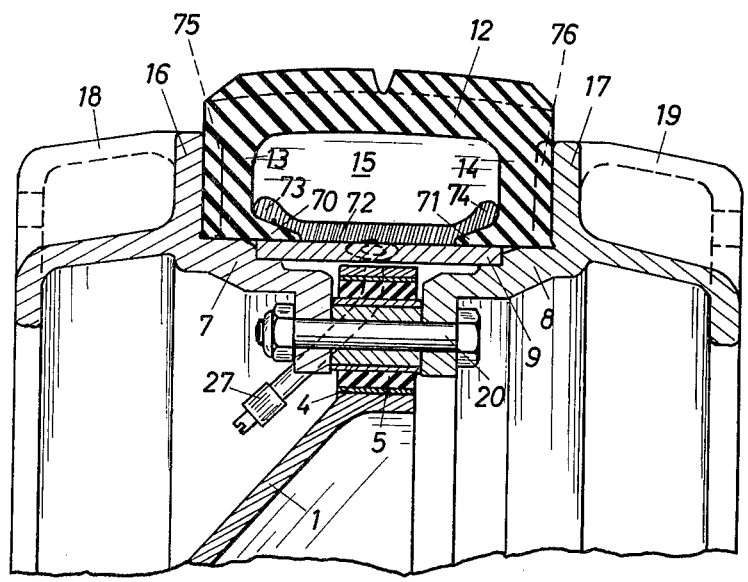

The modification of FIG. 10 differs from the previously described embodiments in that the limbs 13 and 14 of the tire 12 are provided at their free ends with axially inwardly projecting flaps 70, 71 resting on the ring 9 which is in this case flat. In this embodiment, a particularly good hermetic seal can be achieved for the chamber 15 if it is intended to inflate the tire with air through the valve 27. To improve the seal, an additional ring 72 of resilient material is provided within the chamber 15 and the beaded edges 73 and 74 of the additional ring overlie the flaps 70 and 71.

Further, the lateral rim edges 16 and 17 are provided with axially inwardly projecting ribs 75 and 76 engaging in corresponding grooves in the side walls of the tire 12 to minimize relative rotary displacement between the tire and the rim sections.

Figure 11:
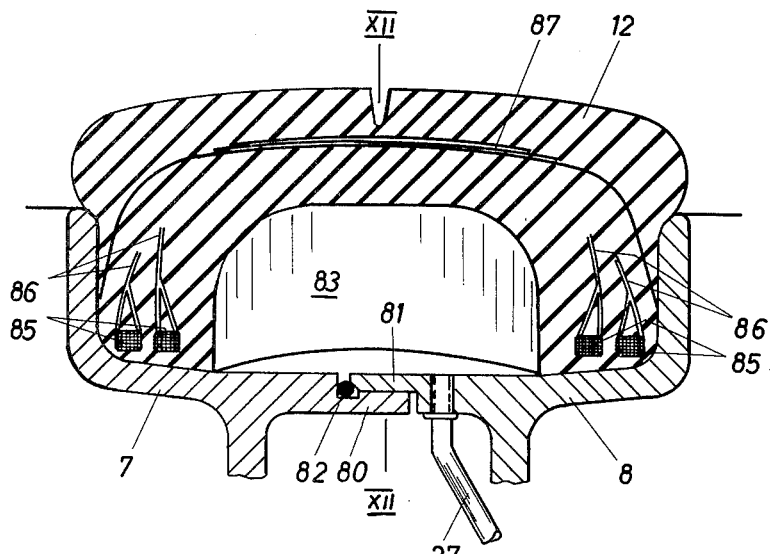
Figure 12:
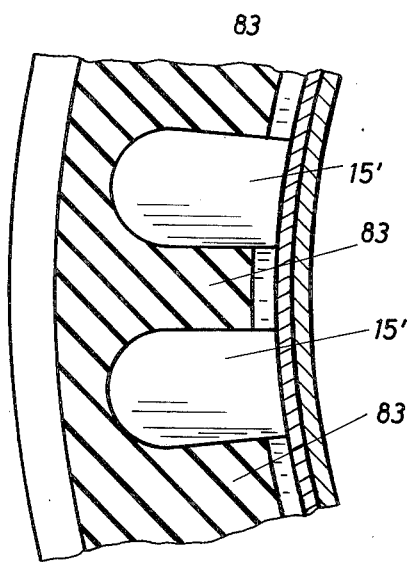
FIG. 12 is a sectional elevation taken on the line XII—XII in FIG. 11.

FIGS. 11 and 12 illustrate yet another modification of a ground wheel according to the invention in which the special internal clamping ring 9 of the previously described embodiments has been omitted. Instead, the rim sections 7 and 8 are provided with axial overlapping web-like projections 80 and 81. The overlap is sealed by an internal sealing ring 82 which becomes compressed as the rim sections are bolted together by the bolts 20. Such bolt connection can be the same as that described with reference to FIG. 1, but it is not illustrated in FIG. 11.

The tire 12 used in the embodiment of FIGS. 11 and 12 is provided with transverse internal ribs 83 which are spaced circumferentially of the tire and which bridge the internal width of the tire. The ribs 83 do not extend radially inwardly right up to the overlapping projections 80 and 81 so that the air chambers 15' formed between the ribs may remain in communication with one another.

Further, the outer edges of the tire 12 are bead formations which engage over the outer edges of the rim sections 7 and 8 adjacent the tire so that the intrusion of dirt between the tire and rim sections is minimized. It will be advantageous if the preferably treaded running surface of the tire 12 forms a direct continuation of the rib profiles of the rim sections 7 and 8.

The hereinbefore described generally U-section tire may be reinforced with inserts. This is of particular advantage in the embodiment of FIGS. 11 and 12, where the inherent stiffness of the tire is increased by incorporating steel cables 85, wire inserts 86, cord or fabric inserts 87 and/or inserts of some other material having a good compressive or tensile strength.

I claim:
1. A missile-proof vehicle wheel consisting of two spaced metal rims, outwardly directed lateral ribs on the peripheral surfaces of said rims, a tire, said tire being made of elastic material and having a peripheral ground engaging wall and two radially depending side walls, clamping means, said tire being clamped by said side walls between said rims by said clamping means so that a hollow sealed chamber is formed and said ground engaging wall protrudes beyond the peripheral surfaces of said rims, said ground engaging wall being of a thickness which is approximately the amount by which said tire protrudes beyond the periphery of said rims so that the hollow within said tire is protected from lateral penetration by said rims said rims together comprising approximately one half the running surface of said wheel, mounting means connected to said rims for resiliently mounting said wheel on a vehicle, only said ground engaging wall contacting the ground when traveling on hard terrain and said tire sinking into soft terrain whereby the outwardly directed ribs of the rims is brought into engagement with the ground.

2. A missile-proof vehicle wheel comprising a wheel body, means to connect said wheel body to a vehicle axle, said wheel body consisting of a pair of spaced metal rims each having radially inwardly directed axially spaced flanges resiliently connected to said wheel body a metal spacer ring disposed between and bridging said flanges, and a resilient tire mounted on said wheel body, said tire having a peripheral wall and two radially depending side walls, each of said side walls being of a width of one-quarter to one-third of the total tire width, clamping means extending through said flanges, said side walls being clamped between the rim sections with said spacer ring abuttingly engaging the axially inward ends of said side walls, said spacer ring being disposed such that a cavity is bounded inside the tire between the ring, the peripheral tire wall and the side walls form a sealed chamber having a height substantially equal to the thickness of the peripheral tire wall, said chamber being located substantially radially inwardly of the largest diameter of said rim sections so that said chamber is protected against lateral impingement by a missile, radially outwardly directed integral ribs on said rim sections, said ribs which together with the tire constitute the running surface of said wheel, said ribs together comprising approximately one half said running surface.

3. A missile-proof vehicle wheel according to claim 2, wherein said rims and rings are made from an aluminum alloy having a thermal conductivity higher than 0.15 calorie per centimeter second degree, contacting faces of said rims and tires being profiled to increase the area for the withdrawal of heat and said ribs having detachably mounted steel inserts thereby providing wear resistance for said rims.

4. A missile-proof vehicle wheel according to claim 2 wherein the total width of said peripheral wall of said tire constitutes no more than half of the total width of the wheel and the total width of the wheel corresponding to the width of an ordinary vehicle wheel.

5. A missile-proof vehicle wheel comprising a wheel body, means to mount said wheel body on a vehicle axle, two spaced metal rims, a spacer ring disposed between said rims, a tire of resilient material mounted on said wheel body, said tire having a peripheral wall and two depending side walls, each of said side walls of a width of about one-quarter to one-third of the total tire width, clamping means, said side walls being clamped between two rims abutting the axially outward sides of said limbs and said spacer ring, said ring having said faces lying against the axially inward faces of said side walls such that an internal cavity bounded between the surface of said spacer ring, the peripheral tire wall and the side walls form a sealed chamber having a height substantially equal to the thickness of said peripheral tire wall, the radially outward extremity of said chamber as determined by the radially inward side of said peripheral tire wall lying substantially radially inwardly of radially outermost edges of said rim sections such that said chamber is armored against lateral impingement by a missile, said rim sections being connected to said wheel body by resilient means such that resilient displacement of said rim sections is permitted relatively to said wheel body in an axial and radial direction, said rims and said tire being provided with inter-engaging projections and recesses preventing relative rotation between said tire and clamping means, said rims being furnished at their radially outward sides with radially outwardly extending ribs which, together with the tire, form the running surface of the wheel, and an additional rim portion having outwardly projecting ribs forming a continuation of said running surface being bolted to at least one of said rim sections thereby enabling said wheel to be used in marshy areas.

6. The vehicle wheel of claim 5 wherein said additional rim portion comprises axially projecting pins engaging in complementary recesses in said rim section and serving to center said rim section.

7. The vehicle wheel of claim 5 wherein apertures are provided in radially inwardly directed flange of said rim section for the bolt connection of said additional rim portion, each aperture receiving a bolt and having a size such that a nut on the bolt can be passed therethrough, and wherein cotter means preventing withdrawal of said bolt are inserted between said nut and the axially inward face of said rim section.

8. A vehicle wheel according to claim 2 wherein said outwardly projecting ribs comprise recesses in said rims, said recesses having slightly projecting inserts of wear resistant material mounted therein.

9. A vehicle wheel according to claim 8 wherein said inserts are of steel and are connected to said recesses with bolts introduced from radially inwardly of the wheel.

10. A missile-proof vehicle wheel comprising a wheel body, means to mount said wheel body on a vehicle axle, said wheel body consisting of a pair of spaced metal rims each having radially inwardly directed axially spaced flanges resiliently connected to said wheel body, a metal spacer ring disposed between and bridging said flanges, a resilient tire mounted on said wheel body, said tire having a peripheral wall and two depending side walls, each of said side walls having a width of one-quarter to one-third of the total tire width, clamping means extending through said flanges, said side walls being clamped between the rims with said spacer ring abuttingly engaging the axially inward ends of said side walls so that a sealed chamber bounded by the inside of the tire and the ring is formed, said sealed chamber having a height substantially equal to the thickness of said peripheral tire wall but terminating radially inwardly of said rim sections so as to be protected against lateral impingement by a missile, said rim sections being connected to said wheel body by resilient means which permit resilient axial and radial adjustment of said rims relatively to said wheel body, said rims and said tire being provided with inter-engaging projections and recesses which prevent relative rotation between the tire and the clamping means integrally formed ribs on said rims, said rims extending radially outwardly transversely of said tire, said rims together with the tire forming the running surface of said wheel with said rims forming about half said running surface.

11. A missile-proof vehicle wheel comprising a wheel body, means to mount said wheel body on a vehicle axle, said wheel body consisting of two spaced metal rims each having radially inwardly directed axially spaced flanges resiliently connected to said wheel body, a metal spacer ring disposed between and bridging said flanges, a resilient tire mounted on said wheel body, said tire having a peripheral wall and two radially inwardly projecting side walls each of a width of one-quarter to one-third of the total width of the tire, clamping means extending through said flanges, said side walls being clamped between the rims with said spacer ring abuttingly engaging the axially inward ends of said side walls forming a sealed chamber bounded by said tire and the radially outward surface of said ring, said sealed chamber having a height substantially equal to the thickness of the peripheral tire wall, said chamber terminating radially outwardly beneath the radially outermost edges of said rims so that said chamber is armored against lateral impingement by a missile, said rims being connected to said wheel body by resilient means such that resilient axial and radial displacement of said rims is possible relative to said wheel body, said resilient means comprising an outer sleeve connected to said wheel body, an inner sleeve and a resilient sleeve disposed intermediate said inner and outer sleeves, said rims being connected to each other and to the wheel body by bolts passing through the inner sleeve.

12. A missile-proof vehicle wheel comprising a wheel body, means to mount said wheel body on a vehicle axle, said wheel body consisting of a pair of spaced metal rims each having radially inwardly directed axially spaced flanges resiliently connected to said wheel body, a metal spacer ring disposed between and bridging said flanges, a resilient tire mounted on said wheel body, said tire having a peripheral wall and two depending side walls, each of said side walls having a width of one-quarter to one-third of the total tire width, clamping means extending through said flanges, said side walls being clamped between the rims with said spacer ring abuttingly engaging the axially inward ends of said side walls so that the radially outward side of said ring and the cavity defined by the walls of said tire form a sealed chamber having a height substantially equal to the thickness of the peripheral tire wall, the radially outward extent of said chamber as determined by the radially inward surface of said tire wall being less than the radially outward extent of said rims whereby said chamber is armored against lateral impingement by a missile, said rims and said tire being provided with interengaging projections and recesses for preventing relative rotation between said tire and said rims.

13. A missile-proof vehicle wheel comprising a wheel body adapted to be connected to a vehicle axle, said wheel body consisting of a pair of spaced metal rims each having radially inwardly directed axially spaced flanges resiliently connected to said wheel body, a metal spacer ring disposed between and bridging said flanges, a resilient tire mounted on said wheel body, said tire having a peripheral wall and two depending side walls each of a width of one-quarter to one-third the total tire width, clamping means extending through said flanges, said side walls being clamped between the rims with said spacer ring abuttingly engaging the axially inward ends of said side walls such that a cavity bounded between the surface of said ring, the peripheral and side walls of said tire form a sealed chamber of a height substantially equal to the thickness of said peripheral wall, the radially outwardly extent of said chamber being less than the radially outwardly extent of said rims whereby said chamber is armored against lateral impingement by a missile, said rims being connected to said wheel body by resilient means such that axial and radial resilient displacement of said rims is permitted relative to said wheel body, said rims and said tire being provided with inter-engaging projections which prevent relative rotation between said tire and said rims.

References Cited by the Examiner

UNITED STATES PATENTS

| | | | |
|---|---|---|---|
| 851,585 | 4/1907 | Burnett | 301—39 X |
| 1,122,875 | 12/1914 | Doty | 152—401 |
| 1,248,863 | 12/1917 | Humphrys | 152—158 X |
| 1,462,117 | 7/1923 | McClintock | 152—401 |
| 1,503,684 | 8/1924 | Foley | 301—40 |
| 1,862,269 | 6/1932 | Johnson | 152—384 X |
| 1,965,058 | 7/1934 | Seabra | 301—39 |

FOREIGN PATENTS

| | | |
|---|---|---|
| 11,481 | 1913 | Great Britain. |
| 319,007 | 1931 | Great Britain. |
| 983,362 | 2/1951 | France. |
| 1,026,545 | 2/1953 | France. |

BENJAMIN HERSH, *Primary Examiner.*

ARTHUR L. LA POINT, *Examiner.*

R. J. JOHNSON, *Assistant Examiner.*